United States Patent
Lee

(10) Patent No.: US 12,028,394 B2
(45) Date of Patent: Jul. 2, 2024

(54) METHOD AND APPARATUS FOR PROVIDING CLOUD STREAMING SERVICE

(71) Applicant: SK Planet Co., Ltd., Seongnam-si (KR)

(72) Inventor: Yung-Gi Lee, Seongnam-si (KR)

(73) Assignee: SK PLANET CO., LTD., Seongnam-si (KR)

(*) Notice: Subject to any disclaimer, the term of this patent is extended or adjusted under 35 U.S.C. 154(b) by 5 days.

(21) Appl. No.: 17/325,009

(22) Filed: May 19, 2021

(65) Prior Publication Data

US 2021/0377328 A1    Dec. 2, 2021

(30) Foreign Application Priority Data

May 29, 2020 (KR) .................. 10-2020-0065044

(51) Int. Cl.
| | |
|---|---|
| *H04L 65/70* | (2022.01) |
| *H04L 65/61* | (2022.01) |
| *H04L 65/611* | (2022.01) |
| *H04N 19/11* | (2014.01) |
| *H04N 19/132* | (2014.01) |
| *H04N 19/159* | (2014.01) |
| *H04N 19/593* | (2014.01) |
| *H04N 21/2343* | (2011.01) |
| *H04N 21/63* | (2011.01) |

(52) U.S. Cl.
CPC .......... *H04L 65/70* (2022.05); *H04L 65/61* (2022.05); *H04N 19/132* (2014.11); *H04N 19/159* (2014.11); *H04N 19/593* (2014.11); *H04N 21/234345* (2013.01); *H04L 65/611* (2022.05); *H04N 19/11* (2014.11); *H04N 21/631* (2013.01)

(58) Field of Classification Search
None
See application file for complete search history.

(56) References Cited

U.S. PATENT DOCUMENTS

| | | | |
|---|---|---|---|
| 10,523,914 B1 * | 12/2019 | Phillips | H04N 19/146 |
| 2010/0061447 A1 * | 3/2010 | Tu | H04N 21/2383 375/240.03 |
| 2011/0145879 A1 * | 6/2011 | Rajamani | G06F 3/1454 725/116 |
| 2013/0132510 A1 * | 5/2013 | Ye | H04N 21/2343 709/217 |
| 2013/0322553 A1 * | 12/2013 | Eleftheriadis | H04N 19/89 375/240.29 |

(Continued)

FOREIGN PATENT DOCUMENTS

| | | | | |
|---|---|---|---|---|
| CN | 101321287 A | * | 12/2008 | |
| CN | 101742321 A | * | 6/2010 | |
| KR | 20160109805 A | * | 9/2016 | ........... H04N 21/236 |

*Primary Examiner* — Mohammed Jebari
(74) *Attorney, Agent, or Firm* — WTA Patents

(57) ABSTRACT

Disclosed herein are a method and apparatus for providing a cloud streaming service. The method for providing a cloud streaming service includes segmenting the frame to be provided through cloud streaming into a first area and a second area, generating a first elementary stream by encoding the first area, generating a second elementary stream by encoding the second area, and merging the first elementary stream and the second elementary stream and transmitting a merged stream based on a request from a user.

16 Claims, 7 Drawing Sheets

(56) References Cited

U.S. PATENT DOCUMENTS

| | | | | |
|---|---|---|---|---|
| 2015/0043637 A1* | 2/2015 | Morigami | .............. | H04N 19/51 |
| | | | | 375/240.12 |
| 2017/0287525 A1* | 10/2017 | Puri | .............. | H04N 21/440245 |
| 2017/0347122 A1* | 11/2017 | Chou | ......................... | G06T 9/00 |
| 2018/0176599 A1* | 6/2018 | Park | ..................... | H04N 19/176 |
| 2019/0075362 A1* | 3/2019 | Cremer | ............. | H04N 21/4532 |
| 2020/0128252 A1* | 4/2020 | Fu | ........................ | H04N 19/186 |
| 2020/0396501 A1* | 12/2020 | Lapicque | ............. | H04N 19/124 |
| 2022/0193541 A1* | 6/2022 | Burke | ..................... | G06T 15/00 |

\* cited by examiner

METHOD AND APPARATUS FOR PROVIDING CLOUD STREAMING SERVICE

CROSS REFERENCE TO RELATED APPLICATION

This application claims the benefit of Korean Patent Application No. 10-2020-0065044, filed on May 29, 2020, which is hereby incorporated by reference in its entirety in this application.

BACKGROUND OF THE INVENTION

1. Technical Field

The present invention relates generally to a method and apparatus for providing a cloud streaming service, and more particularly to technology for providing a cloud streaming service capable of accommodating a large number of concurrent users by separating a frame to be provided through cloud streaming into areas and encoding the areas in different modes.

2. Description of the Related Art

Unless otherwise indicated herein, the materials described in this section are not the prior art with regard to the claims in this application, and are not admitted to be prior art by inclusion in this section.

With the improvement in the performance of Set-Top Boxes (STBs), the demand for increasing sophistication of the user interface of the STB arises, and in recent user interfaces, many scenarios consume more STB resources (a CPU, memory, and the like) for simple animated operations, video previews, and the like.

However, the increasing number of such scenarios causes a problem in which it is difficult to smoothly provide service not only in a legacy box or the STB of a thin client but also in a high-performance STB.

In order to solve this problem, cloud streaming can be used, whereby service may be provided without delay not only in a high-performance STB but also in a legacy box or a thin client.

Cloud streaming is one of methods for transmitting and playing a multimedia file, such as sound, video or the like, and is a data transmission method via which data can be seamlessly transmitted or played in real time over the Internet while reading the data. Files are generally executed after being completely downloaded, but when a file having a large size, such as video, is played, it may take a lot of time to download the file. Accordingly, a file is played while being downloaded through streaming, whereby the amount of time a user has to wait may be significantly reduced.

Meanwhile, a Cloud Streaming Server (CSS) has to run user interfaces, including a corresponding animated operation, a video preview, and the like, which require large amounts of resources. However, when multiple set-top boxes simultaneously access the CSS and request video playback tasks, such as previews, it is difficult for an apparatus for providing a cloud streaming service to simultaneously play multiple pieces of video content.

SUMMARY OF THE INVENTION

An object of the present invention is to encode the image to be provided through cloud streaming on a server side and provide the same.

Another object of the present invention is to separately encode the respective areas of the image to be provided through cloud streaming, thereby reducing the consumption of network resources.

A further object of the present invention is to encode an elementary stream for an image in advance, thereby preventing resources from being overloaded.

Yet another object of the present invention is to provide a cloud streaming service provision apparatus capable of accommodating a greater number of concurrent users (CCUs).

The objects of the present invention are not limited to the above objects, and it will be apparent that other objects can be derived from the following description.

In order to accomplish the above objects, a method for providing a cloud streaming service according to an embodiment of the present invention includes segmenting the frame to be provided through cloud streaming into a first area and a second area, generating a first elementary stream by encoding the first area, generating a second elementary stream by encoding the second area, and merging the first elementary stream and the second elementary stream and transmitting the merged stream based on a request from a user.

Here, the first area may be an area configured with one or more basic coding units included in a section in which video is playing or in which motion is present in the frame.

Here, the second area may be an area configured with one or more basic coding units included in the remaining section, excluding the first area, in the frame.

Here, the basic coding unit may be any one of a macroblock and a Coding Tree Unit (CTU).

Here, segmenting the frame may be configured to segment the frame by classifying the first area and the second area as any one of a slice, a tile, a brick, and a sub-picture.

Here, the first elementary stream may be generated by encoding the first area using only P pictures.

Here, the first elementary stream may be generated by encoding a basic coding unit included in the first P picture of the first area using an intra mode.

Here, the second elementary stream may be generated by encoding the second area using a skip mode.

Also, in order to accomplish the above objects, an apparatus for providing a cloud streaming service according to an embodiment of the present invention includes one or more processors and executable memory for storing at least one program executed by the one or more processors, and the at least one program may be configured to segment the frame to be provided through cloud streaming into a first area and a second area, to generate a first elementary stream by encoding the first area, to generate a second elementary stream by encoding the second area, and to merge the first elementary stream and the second elementary stream and transmit a merged stream based on a request from a user.

Here, the first area may be an area configured with one or more basic coding units included in a section in which video is playing or in which motion is present in the frame.

Here, the second area may be an area configured with one or more basic coding units included in the remaining section, excluding the first area, in the frame.

Here, the basic coding unit may be any one of a macroblock and a Coding Tree Unit (CTU).

Here, the at least one program may segment the frame by classifying the first area and the second area as any one of a slice, a tile, a brick, and a sub-picture.

Here, the at least one program may generate the first elementary stream by encoding the first area using only P pictures.

Here, the at least one program may generate the first elementary stream by encoding a basic coding unit included in the first P picture of the first area using an intra mode.

Here, the at least one program may generate the second elementary stream by encoding the second area using a skip mode.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
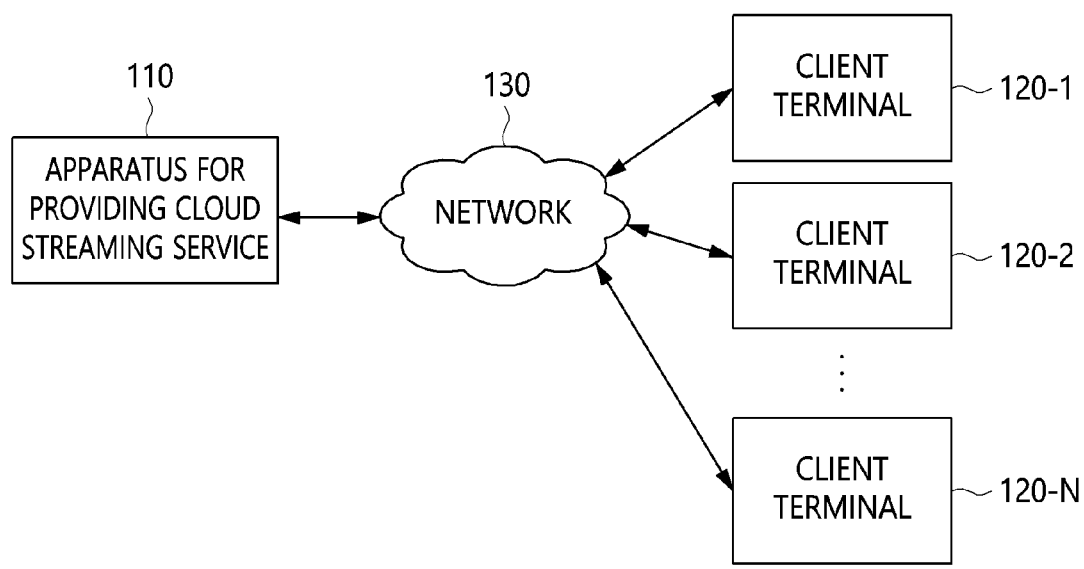
FIG. 1 is a block diagram illustrating the state in which an apparatus for providing a cloud streaming service according to an embodiment of the present invention is used.

A preferred embodiment of the present invention will be described in detail below with reference to the accompanying drawings. However, descriptions of known functions and configurations which have been deemed to unnecessarily obscure the gist of the present invention will be omitted below. Also, it should be understood that the same reference numerals are used to designate the same or similar elements throughout the drawing.

Terms or words used in this specification and claims should not be interpreted according to typical or dictionary meanings, but should be interpreted as having meanings and concepts adapted to the technical idea of the present invention based on the principle that an inventor is able to properly define the concept of the terms in order to explain the present invention in the best way. Therefore, embodiments disclosed in this specification and configurations illustrated in the drawings are merely preferred embodiments of the present invention and do not fully describe the technical idea of the present invention, and thus it should be understood that there may be various equivalents and alterations replacing them at the filing date of the present application. Also, it will be understood that, although the terms "first", "second", etc. may be used herein to describe various elements, the terms are only used to distinguish one element from another, rather than being intended to limit these elements.

FIG. 1 is a block diagram illustrating the state in which an apparatus for providing a cloud streaming service according to an embodiment of the present invention is used.

Referring to FIG. 1, the apparatus 110 for providing a cloud streaming service according to an embodiment of the present invention may provide a cloud streaming service to multiple client terminals 120-1 to 120-N over a network 130.

Here, the apparatus 110 for providing a cloud streaming service according to an embodiment of the present invention encodes the image to be streamed and provides the same to the multiple client terminals 120-1 to 120-N over the network 130, whereby the consumption of large amounts of resources of the client terminals 120-1 to 120-N is avoided.

More specifically, the apparatus 110 for providing a cloud streaming service according to an embodiment of the present invention may perform the functions of separately encoding the respective areas of the frame to be provided through cloud streaming and merging and transmitting the same.

More specifically, the apparatus 110 for providing a cloud streaming service according to an embodiment of the present invention may first collect basic coding units corresponding to a section in which video is playing or in which motion is present in an entire user interface area (picture or frame) and define the same as a first area, and may collect basic coding units corresponding to the remaining area and define the same as a second area.

Here, the basic coding unit may be any one of a macroblock and a Coding Tree Unit (CTU).

Here, the macroblock is a prediction unit that is a group of multiple pixel blocks for motion compensation and motion prediction in an image compression method.

Accordingly, an encoding (coding) process may be performed in units of macroblocks, and respective macroblocks may be encoded in different encoding modes.

Here, the CTU is a hierarchical coding structure technology used in an image compression method, and has a characteristic in which compression efficiency can be improved by supporting a variable size, unlike a macroblock.

Here, all methods capable of dividing a picture, such as slices, tiles, sub-pictures, and the like, may be used as the method of separating the first area and the second area.

Here, the apparatus 110 for providing a cloud streaming service according to an embodiment of the present invention encodes the first area and the second area using different modes, thereby generating a first elementary stream and a second elementary stream.

Here, the apparatus 110 for providing a cloud streaming service according to an embodiment of the present invention encodes all of the basic coding units of the first area in the first frame to be provided through cloud streaming using an intra mode, thereby generating a first elementary stream for the first area.

Here, the apparatus 110 for providing a cloud streaming service according to an embodiment of the present invention encodes all of the basic coding units of the first area in the remaining frames, excluding the first frame, using various available encoding modes, such as an intra mode, an inter mode, a skip mode, and the like, thereby generating a first elementary stream for the first area.

Also, the apparatus 110 for providing a cloud streaming service according to an embodiment of the present invention encodes all of the basic coding units of the second area using a skip mode, thereby generating a second elementary stream for the second area.

Here, the reason for generating the second elementary stream through encoding using a skip mode is that a general user interface displays personalized information (e.g., information such as points, vouchers, or the like of a user) in an area in which video is not playing.

Accordingly, the second area is in a skip mode during the transmission of video, so an image that is the same as the image located in the same location in the previous frame (picture) is transmitted, whereby personalized information that is maintained without change may be shown to a user.

Also, when a request by a user is received from any one of the client terminals 120-1 to 120-N, the apparatus 110 for providing a cloud streaming service may merge the previously generated first elementary stream and second elementary stream and transmit the merged stream to the client terminal.

Alternatively, an elementary stream may be generated in advance by merging the first elementary stream and the second elementary stream before a request is received from a user, and the elementary stream, which is generated in advance through merging, may simply be transmitted in response to a request from a user.

Alternatively, the apparatus 110 for providing a cloud streaming service according to an embodiment of the present invention may transmit an elementary stream in response to a request from a user in the state in which the elementary stream has been generated and prepared, as in the above-described embodiment, or may generate an elementary stream in real time upon receiving a request from a user and transmit the same to the corresponding one of the client terminals 120-1 to 120-N.

Here, the corresponding one of the client terminals 120-1 to 120-N may decode the elementary stream received from the apparatus 110 for providing a cloud streaming service according to an embodiment of the present invention and deliver the same to a user through the screen thereof.

Here, the client terminals 120-1 to 120-N may be devices capable of running an application based on a cloud-computing system by being connected to a communication network, and may be any of various types of terminals including all types of information communication devices, multimedia terminals, wired terminals, fixed-type terminals, Internal Protocol (IP) terminals, and the like, rather than being limited to mobile communication terminals.

Also, each of the client terminals 120-1 to 120-N may be a mobile terminal compliant with any of various mobile communication specifications, such as a Set-Top Box (STB), a legacy box, a mobile phone, a Portable Multimedia Player (PMP), a Mobile Internet Device (MID), a smartphone, a desktop, a tablet PC, a note book computer, a net book, a Personal Digital Assistant (PDA), a smart TV, an information communication device, or the like.

Also, each of the client terminals 120-1 to 120-N may receive various kinds of information, such as numbers, letters, and the like, and may deliver input signals, which are related to settings of various functions and control of the functions thereof, to the control unit thereof via the input unit thereof. Also, the input unit of each of the client terminals 120-1 to 120-N may be configured by including at least one of a keypad and a touch pad, which generate an input signal in response to a touch or manipulation by a user. Here, the input unit of each of the client terminals 120-1 to 120-N and the display unit thereof are configured in the form of a single touch panel (or a touch screen), thereby performing both an input function and a display function. Also, the input unit of each of the client terminals 120-1 to 120-N may use not only input devices, such as a keyboard, a keypad, a mouse, a joystick, and the like, but also all types of input means to be developed in the future.

Also, the display unit of each of the client terminals 120-1 to 120-N may display information about a series of operation states and operation results, which is generated when the client terminal performs a function. Also, the display unit of each of the client terminals 120-1 to 120-N may display the menu thereof and user data input by a user. Here, the display unit of each of the client terminals 120-1 to 120-N may be configured as a Liquid Crystal Display (LCD), a Thin Film Transistor LCD (TFT-LCD), a Light-Emitting Diode (LED), an Organic LED (OLED), an Active Matrix OLED (AMOLED), a retina display, a flexible display, a 3-dimensional display, or the like. Here, when the display unit of each of the client terminals 120-1 to 120-N is configured in the form of a touch screen, it may perform some or all of the functions of the input unit thereof.

Also, the storage unit of each of the client terminals 120-1 to 120-N is a device for storing data, and may include a main storage device and an auxiliary storage device and store applications required for performing the functions of the client terminal. Such a storage unit of each of the client terminals 120-1 to 120-N may include a program area and a data area. Here, when it activates each function in response to a request from a user, each of the client terminals 120-1 to 120-N provides the function by running corresponding applications under the control of the control unit.

Also, the communication unit of each of the client terminals 120-1 to 120-N may perform functions for transmitting and receiving data to and from the apparatus 110 for providing a cloud streaming service via the network 130. Here, the communication unit of each of the client terminals 120-1 to 120-N may include an RF transmission means for up-conversion and amplification of the frequency of the signal to be transmitted and an RF reception means for low-noise amplification of a received signal and down-conversion of the frequency thereof. Such a communication unit of each of the client terminals 120-1 to 120-N may include at least one of a wireless communication module and a wired communication module. Also, the wireless communication module is a component for transmitting and receiving data based on a wireless communication method, and when the client terminals 120-1 to 120-N use wireless communication, they may transmit and receive data to and from the apparatus 100 for providing a cloud streaming service using any one of a wireless network communication module, a wireless LAN communication module, and a wireless PAN communication module. Also, the wired communication module is for transmitting and receiving data in a wired manner. The wired communication module accesses the network 130 using a cable, thereby transmitting and receiving data to and from the apparatus 110 for providing a cloud streaming service. That is, the client terminals 120-1 to 120-N may access the network 130 using a wireless communication module or a wired communication module, and may transmit and receive data to and from the apparatus 110 for providing a cloud streaming service through the network 130.

Also, the control unit of each of the client terminals 120-1 to 120-N may be a processing device for running an Operating System (OS) and respective components. For example, the control unit may control the overall process of accessing the apparatus 110 for providing a cloud streaming service. When access to the apparatus 110 for providing a cloud streaming service is made through a special service application, the control unit may control the overall process of executing the service application in response to a request from a user, and may perform control such that the request for using a service is transmitted to the apparatus 110 for providing a cloud streaming service at the time of execution of the application. Here, the control unit may perform control such that information about the client terminal required for user authentication is transmitted along with the request.

Also, the network 130 serves to provide a channel via which data is delivered between the apparatus 110 for providing a cloud streaming service and the client terminals 120-1 to 120-N, and may be conceptually understood as including networks that are currently being used and networks that have yet to be developed.

For example, the network 130 may be any one of a wired/wireless local area communication network for providing communication between various kinds of data devices in a limited area, a mobile communication network for providing communication between mobile devices or between a mobile device and the outside thereof, a satellite communication network for providing communication between earth stations using a satellite, and a wired/wireless communication network, or may be a combination of two or more selected therefrom.

Meanwhile, the transmission protocol standard for the network 130 is not limited to existing transmission protocol standards, but may include all transmission protocol standards to be developed in the future.

Also, the network used between the apparatus 110 for providing a cloud streaming service and the client terminals 120-1 to 120-N in FIG. 1 may be different from or the same as the network used between the client terminals 120-1 to 120-N.

Through the above-described configuration, the apparatus 110 for providing a cloud streaming service according to an embodiment of the present invention may encode the image to provide through cloud streaming on a server side and provide the same.

Also, the apparatus 110 for providing a cloud streaming service according to an embodiment of the present invention separately encodes the respective areas of the image to provide through cloud streaming, thereby reducing the consumption of network resources.

Also, the apparatus 110 for providing a cloud streaming service according to an embodiment of the present invention encodes an elementary stream for an image in advance, thereby preventing resources from being overloaded.

Also, the apparatus 110 for providing a cloud streaming service according to an embodiment of the present invention may provide a cloud streaming service provision apparatus capable of accommodating a greater number of concurrent users (CCUs).

Figure 2:
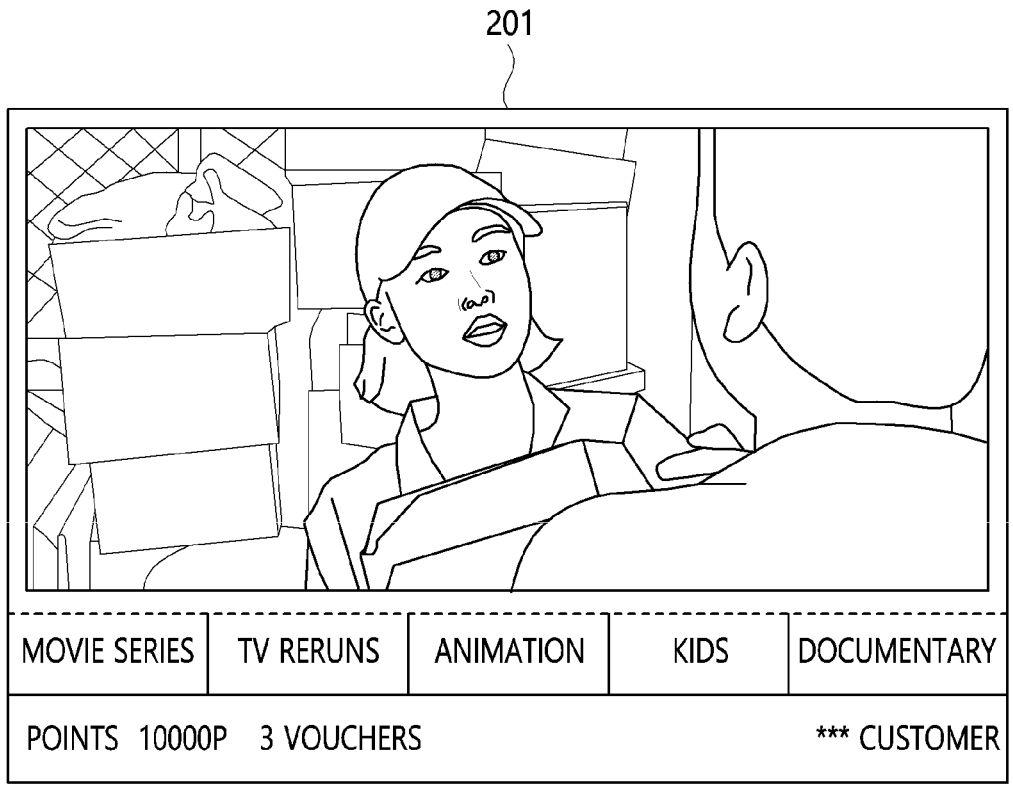
FIG. 2 is an exemplary view illustrating the use of an apparatus for providing a cloud streaming service, to which a conventional art is applied.

FIG. 2 is an exemplary view illustrating the use of an apparatus for providing a cloud streaming service to which a conventional art is applied.

Referring to FIG. 2, the apparatus for providing a cloud streaming service to which a conventional art is applied consumes large amounts of hardware resources because it encodes the entire image 201 to be provided through cloud streaming at once in response to a request from a user.

Also, because the apparatus for providing a cloud streaming service to which the conventional art is applied encodes an image without differentiating between dynamic parts and static parts thereof, the data to be streamed may be generated so as to have a large size.

Accordingly, the apparatus for providing a cloud streaming service to which the conventional art is applied allows only a small number of concurrent users (CCUs), who are permitted to simultaneously access the apparatus.

On the other hand, the apparatus for providing a cloud streaming service according to an embodiment of the present invention performs the functions of separately encoding respective areas of a frame and then merging and transmitting the same, thereby solving the problem with the apparatus for providing a cloud streaming service to which the conventional art is applied.

More specifically, the apparatus for providing a cloud streaming service according to an embodiment of the present invention may first collect basic coding units corresponding to a section in which video is playing or in which motion is present in an entire user interface area (picture or frame) and define the same as a first area, and may collect basic coding units corresponding to the remaining area and define the same as a second area.

Here, the apparatus for providing a cloud streaming service according to an embodiment of the present invention encodes the first area and the second area using different modes, thereby generating a first elementary stream and a second elementary stream.

Here, the apparatus for providing a cloud streaming service according to an embodiment of the present invention encodes all of the basic coding units of the first area in the first frame to be provided through cloud streaming using an intra mode, thereby generating a first elementary stream for the first area.

Here, the apparatus for providing a cloud streaming service according to an embodiment of the present invention encodes all of the basic coding units of the first area in the remaining frames, excluding the first frame, using various available encoding modes, such as an intra mode, an inter mode, a skip mode, and the like, thereby generating a first elementary stream for the first area.

Also, the apparatus for providing a cloud streaming service according to an embodiment of the present invention encodes all of the basic coding units of the second area using a skip mode, thereby generating a second elementary stream for the second area.

Here, the reason for generating the second elementary stream through encoding using a skip mode is that a general user interface displays personalized information (e.g., information such as points, vouchers, or the like of a user) in an area in which video is not playing.

Accordingly, the second area is in a skip mode during the transmission of video, so an image that is the same as the image located in the same location in the previous frame (picture) is transmitted, whereby personalized information that is maintained without change may be shown to a user.

Also, when a request by a user is received from a client terminal, the apparatus for providing a cloud streaming service may merge the previously generated first elementary stream and second elementary stream and transmit the merged stream to the client terminal.

Alternatively, an elementary stream may be generated in advance by merging the first elementary stream and the second elementary stream before a request is received from a user, and the elementary stream, which is generated in advance through merging, may simply be transmitted in response to a request from a user.

Alternatively, the apparatus for providing a cloud streaming service according to an embodiment of the present invention may transmit an elementary stream in response to a request from a user in the state in which the elementary stream has been generated and prepared, as in the above-described embodiment, or may generate an elementary stream in real time upon receiving a request from a user and transmit the same to the user.

Accordingly, the apparatus for providing a cloud streaming service according to an embodiment of the present invention may encode the image to provide through cloud streaming on a server side and provide the same.

Also, the apparatus for providing a cloud streaming service according to an embodiment of the present invention separately encodes the respective areas of the image to provide through cloud streaming, thereby reducing the consumption of network resources.

Also, the apparatus for providing a cloud streaming service according to an embodiment of the present invention encodes an elementary stream for an image in advance, thereby preventing resources from being overloaded.

Also, the apparatus for providing a cloud streaming service according to an embodiment of the present invention may provide a cloud streaming service provision apparatus capable of accommodating a greater number of concurrent users (CCUs).

Figure 3:
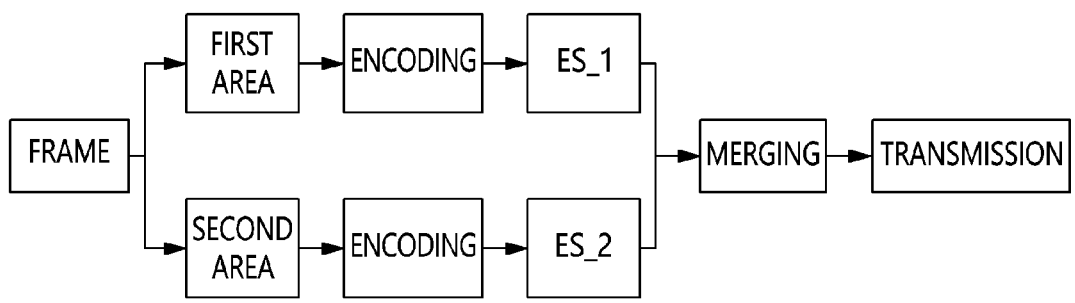
FIG. 3 is a flowchart of the operation of an apparatus for providing a cloud streaming service according to an embodiment of the present invention.

FIG. 3 is a flowchart of the operation of an apparatus for providing a cloud streaming service according to an embodiment of the present invention.

Referring to FIG. 3, the apparatus for providing a cloud streaming service according to an embodiment of the present invention may perform the functions of separately encoding the respective areas of a frame and merging and transmitting the same.

More specifically, the apparatus for providing a cloud streaming service according to an embodiment of the present invention may first collect basic coding units corresponding to a section in which video is playing or in which motion is present in an entire user interface area (picture or frame) and define the same as a first area, and may collect basic coding units corresponding to the remaining area and define the same as a second area.

Here, the basic coding unit may be any one of a macroblock and a Coding Tree Unit (CTU).

Here, the macroblock is a prediction unit that is a group of multiple pixel blocks for motion compensation and motion prediction in an image compression method.

Accordingly, an encoding (coding) process may be performed in units of macroblocks, and respective macroblocks may be encoded in different encoding modes.

Here, the CTU is a hierarchical coding structure technology used in an image compression method, and has a characteristic in which compression efficiency can be improved by supporting a variable size, unlike a macroblock.

Here, all methods capable of dividing a picture, such as slices, tiles, sub-pictures, and the like, may be used as the method of separating the first area and the second area.

Here, the apparatus for providing a cloud streaming service according to an embodiment of the present invention encodes the first area and the second area using different modes, thereby generating a first elementary stream and a second elementary stream.

Here, the apparatus for providing a cloud streaming service according to an embodiment of the present invention encodes all of the basic coding units of the first area in the first frame to be provided through cloud streaming using an intra mode, thereby generating a first elementary stream for the first area.

Here, the apparatus for providing a cloud streaming service according to an embodiment of the present invention encodes all of the basic coding units of the first area in the remaining frames, excluding the first frame, using various available encoding modes, such as an intra mode, an inter mode, a skip mode, and the like, thereby generating a first elementary stream for the first area.

Also, the apparatus for providing a cloud streaming service according to an embodiment of the present invention encodes all of the basic coding units of the second area using a skip mode, thereby generating a second elementary stream for the second area.

Here, the reason for generating the second elementary stream through encoding using a skip mode is that a general user interface displays personalized information (e.g., information such as points, vouchers, or the like of a user) in an area in which video is not playing.

Accordingly, the second area is in a skip mode during the transmission of video, so an image that is the same as the image located in the same location in the previous frame (picture) is transmitted, whereby personalized information that is maintained without change may be shown to a user.

Also, when a request by a user is received from a client terminal, the apparatus for providing a cloud streaming service may merge the previously generated first elementary stream and second elementary stream and transmit the merged stream to the client terminal.

Alternatively, an elementary stream may be generated in advance by merging the first elementary stream and the second elementary stream before a request is received from a user, and the elementary stream, which is generated in advance through merging, may simply be transmitted in response to a request from a user.

Alternatively, the apparatus for providing a cloud streaming service according to an embodiment of the present invention may transmit an elementary stream in response to a request from a user in the state in which the elementary stream has been generated and prepared, as in the above-described embodiment, or may generate an elementary stream in real time upon receiving a request from a user and transmit the same to the user.

Figure 4:
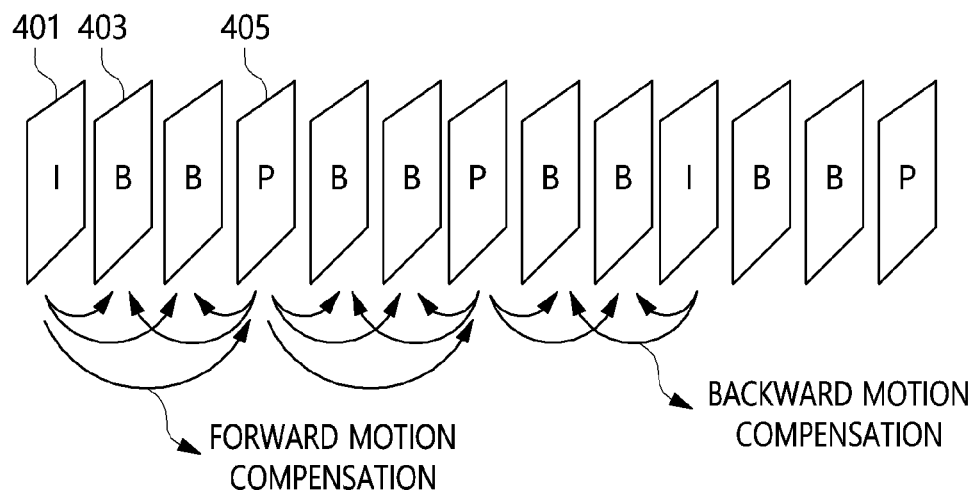
FIG. 4 is a conceptual diagram illustrating a video structure (GOP)

FIG. 4 is a concept diagram illustrating a video structure (GOP).

Referring to FIG. 4, a video structure, that is, a Group Of Pictures (GOP), is configured to include multiple pictures.

Here, the GOP may be used as a basic unit for coding, namely, encoding.

The GOP may be an image data unit that is a collection of data of some previous and subsequent pictures, or may be a video unit that enables access to an arbitrary point and playback of the video therefrom.

Here, the GOP has a characteristic in which a trick mode for access to an arbitrary picture can be realized because random access to each GOP is possible.

This is because coded image data is created from the data including some previous and subsequent pictures, whereby an independent compression coding unit to which random access is possible may be acquired.

Here, the pictures forming the GOP may be classified into I picture 401, P picture 405, and B picture 403 depending on the characteristics thereof.

Here, I picture 401 is a picture created using only a spatial compression technique independently of other pictures, rather than using a temporal compression technique, which uses previous and subsequent pictures in the GOP.

Here, I picture 401 is a reference of other pictures (P picture 405 and B picture 403) that are created by predicting temporal motion.

Here, because I picture 401 is acquired by being independently coded in the corresponding picture without consideration of the preceding and subsequent pictures, a greater number of bits than other pictures is required as the result of compression.

Here, P picture 405 is a picture that is created by predicting temporal motion unidirectionally or in a forward direction in the GOP.

More specifically, P picture 405 compresses only different parts between the previous picture and the current picture by coding the same, whereby a small number of bits may be generated.

Here, P picture 405 references the immediately preceding I picture 401 and P picture 405 such that the subsequent picture is predicted through only forward inter-prediction, and P picture 405 may be a reference of other P pictures 405 and B pictures 403.

Here, B picture 403 is a picture created by predicting temporal motion in forward and backward directions in the GOP.

More specifically, B picture 403 may be created by predicting previous and subsequent motions in more detail from P picture 405 and I picture 401, which are precedent and subsequent thereto.

Here, because B picture 403 definitely requires P picture 405 or I picture 401, a processing delay time may be caused when B picture 403 is processed.

Here, the procedure of processing B picture 403 may be performed in such a way that I picture 401 or P picture 405 immediately before the current picture is processed first, the current picture is processed, and then I picture 401 or P picture 405 immediately after the current picture is processed.

Here, B picture 403 has a characteristic in which it provides the highest amount of compression, among all pictures, because all of forward prediction, backward prediction, and bidirectional prediction are included.

Here, the apparatus and method for providing a cloud streaming service according to an embodiment of the present invention encode images into P pictures 405, as described above, thereby reducing the number of bits to be generated.

Figure 5:
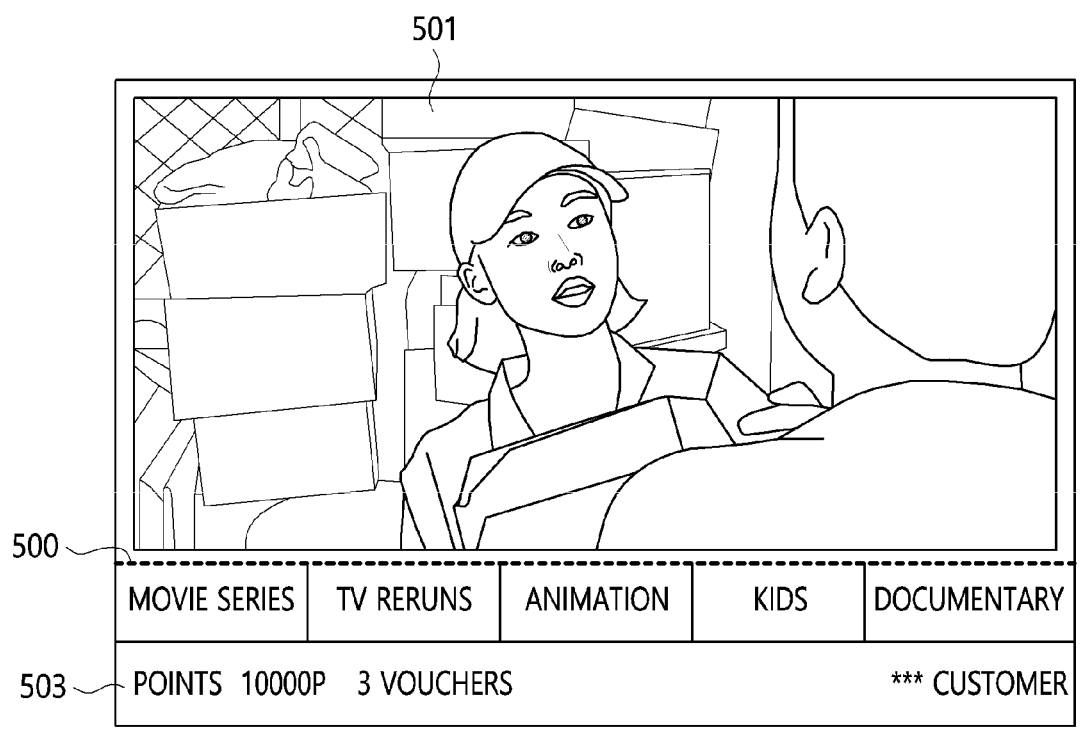
FIG. 5 is an exemplary view illustrating separation of areas in the frame to be provided through cloud streaming according to an embodiment of the present invention.

FIG. 5 is an exemplary view illustrating separation of areas in the frame to be provided through cloud streaming according to an embodiment of the present invention.

Referring to FIG. 5, an apparatus for providing a cloud streaming service according to an embodiment of the present invention may collect basic coding units corresponding to a section in which video is playing in an entire user interface area (picture) and define the same as a first area 501, and may collect basic coding units corresponding to the remaining area and define the same as a second area 503.

Here, the basic coding unit may be any one of a macroblock and a Coding Tree Unit (CTU).

Here, the macroblock is a prediction unit that is a group of multiple pixel blocks for motion compensation and motion prediction in an image compression method.

Accordingly, an encoding (coding) process may be performed in units of macroblocks, and respective macroblocks may be encoded in different encoding modes.

Here, the CTU is a hierarchical coding structure technology used in an image compression method, and has a characteristic in which compression efficiency can be improved by supporting a variable size, unlike a macroblock.

Here, all methods capable of dividing a picture, such as slices, tiles, sub-pictures, and the like, may be used as the method of separating the first area 501 and the second area 503.

Referring to FIG. 5, an example in which the area in which video is playing is defined as the first area 501, the menu area is defined as the second area 503, and the first area 501 and the second area 503 are separated by a slice 500 is illustrated.

Figure 6:
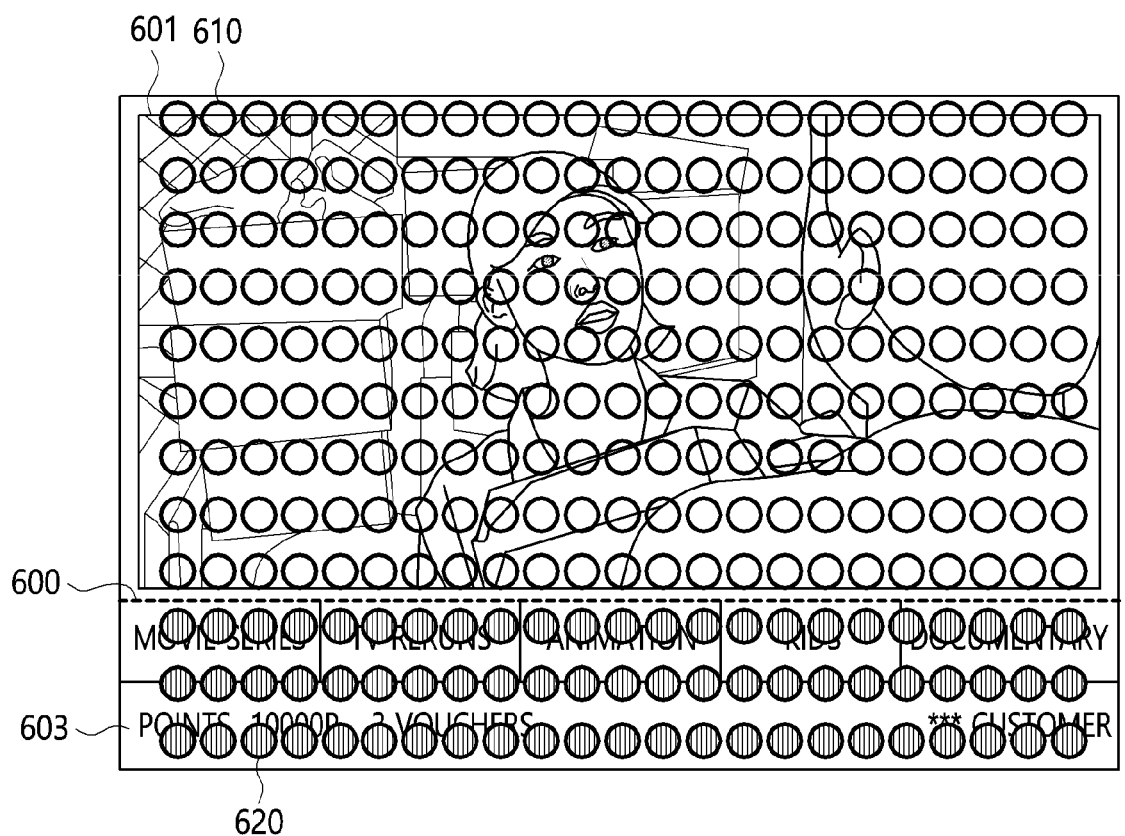
FIG. 6 is an exemplary view illustrating the encoding mode of the first frame to be provided through cloud streaming according to an embodiment of the present invention.
Figure 7:
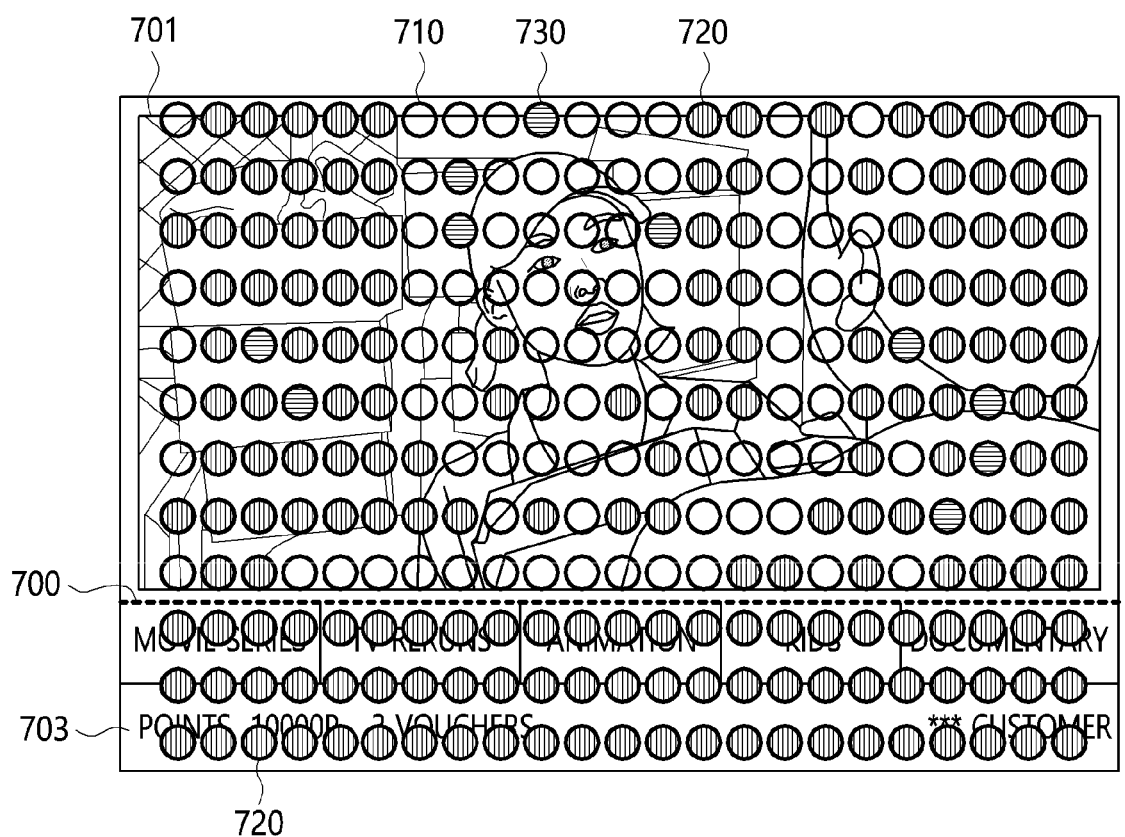
FIG. 7 is an exemplary view illustrating the encoding mode of the remaining frames to be provided through cloud streaming according to an embodiment of the present invention.

FIG. 6 is an exemplary view illustrating the encoding mode of the first frame to be provided through cloud streaming according to an embodiment of the present invention, and FIG. 7 is an exemplary view illustrating the encoding mode of the remaining frames to be provided through cloud streaming according to an embodiment of the present invention.

Referring to FIG. 6 and FIG. 7, the apparatus for providing a cloud streaming service according to an embodiment of the present invention may be provided with elementary stream for a preview image by previously encoding the same.

Here, the apparatus for providing a cloud streaming service according to an embodiment of the present invention may separate the first area 601 or 701, in the entirety of which video is playing (picture), from the second area 603 or 703, excluding the first area 601 or 701, and may encode the first area 601 or 701 and the second area 603 or 703 in different modes.

Here, all of the frames to be provided through cloud streaming may be encoded as P pictures.

Referring to FIG. 6, the apparatus for providing a cloud streaming service according to an embodiment of the present invention encodes all of the basic coding units of the first area 601 in the first frame to be provided through cloud streaming using an intra mode 610, thereby generating a first elementary stream for the first area 601.

Here, the first elementary stream may be generated and stored whenever the content of the user interface is updated or whenever the video content is changed.

Also, the apparatus for providing a cloud streaming service according to an embodiment of the present invention encodes all of the basic coding units of the second area 603 in the first frame to be provided through cloud streaming using a skip mode 620, thereby generating a second elementary stream for the second area 603.

Here, the reason for generating the second elementary stream through encoding using the skip mode 620 is that a general user interface displays personalized information (e.g., information such as points, vouchers, or the like of a user) in the area in which video is not playing.

Accordingly, the second area 603 is in the skip mode 620 during the transmission of video, so an image that is the same as the image located in the same location in the previous frame (picture) is transmitted, whereby personalized information that is maintained without change may be shown to a user.

Referring to FIG. 7, the apparatus for providing a cloud streaming service according to an embodiment of the present invention encodes all of the basic coding units of the first area 701 in the remaining frames, excluding the first frame, using various available encoding modes 730, such as an intra mode 710, an inter mode, a skip mode 720, and the like, thereby generating a first elementary stream for the first area 701.

Here, as in the above-described first frame, the first elementary stream may be generated and stored whenever the content of the user interface is updated or whenever the video content is changed.

Also, the apparatus for providing a cloud streaming service according to an embodiment of the present invention encodes all of the basic coding units of the second area 703 in the remaining frames, excluding the first frame, using a skip mode 720, thereby generating a second elementary stream for the second area 703.

Here, the reason for generating the second elementary stream through encoding using the skip mode 720, as in the above-described first frame, is that a general user interface displays personalized information (e.g., information such as points, vouchers, or the like of a user) in the area in which video is not playing.

Also, when a request by a user is received from a client terminal, the apparatus for providing a cloud streaming service may generate an elementary stream in which the previously generated first elementary stream and the previously generated second elementary stream are merged, and transmit the same to the client terminal.

Alternatively, an elementary stream may be generated in advance by merging the first elementary stream and the second elementary stream before a request is received from a user, and the elementary stream, which is generated in advance through merging, may simply be transmitted in response to a request from a user.

Also, the apparatus for providing a cloud streaming service according to an embodiment of the present invention may transmit an elementary stream in response to a request from a user in the state in which the elementary stream is generated in advance and prepared, as in the above-described embodiment, or may generate an elementary stream in real time upon receiving a request from a user and transmit the same to the user, as will be described below.

The above embodiment may be applied when the user of the client terminal performs a general user interface search.

Here, the apparatus for providing a cloud streaming service according to an embodiment of the present invention may collect basic coding units corresponding to a section in which motion is present in the entire user interface area (picture) and define the same as a first area, and may collect basic coding units corresponding to a section in which no motion is present and define the same as a second area.

Here, the basic coding unit may be any one of a macroblock and a Coding Tree Unit (CTU).

Here, the macroblock is a prediction unit that is a group of multiple pixel blocks for motion compensation and motion prediction in an image compression method.

Accordingly, an encoding (coding) process may be performed in units of macroblocks, and respective macroblocks may be encoded in different encoding modes.

Here, the CTU is a hierarchical coding structure technology used in an image compression method, and has a characteristic in which compression efficiency can be improved by supporting a variable size, unlike a macroblock.

Here, all methods capable of dividing a picture, such as slices, tiles, sub-pictures, and the like, may be used as the method of separating the first area and the second area.

Here, the apparatus for providing a cloud streaming service according to an embodiment of the present invention may separate the first area, in which motion is present in the entire user interface area (picture), from the second area, in which no motion is present, and may encode the first area and the second area in different modes.

Here, all of the frames to be provided through cloud streaming may be encoded as P pictures.

The apparatus for providing a cloud streaming service according to an embodiment of the present invention encodes all of the basic coding unit of the first area in the first frame to be provided through cloud streaming using an intra mode, thereby generating a first elementary stream for the first area.

Here, the first elementary stream may be generated and stored whenever the content of the user interface is updated or whenever the video content is changed.

The apparatus for providing a cloud streaming service according to an embodiment of the present invention encodes all of the basic coding units of the first area in the remaining frames, excluding the first frame, using various available encoding modes, such as an intra mode, an inter mode, a skip mode, and the like, thereby generating a first elementary stream for the first area.

Here, as in the above-described first frame, the first elementary stream may be generated and stored whenever the content of the user interface is updated or whenever the video content is changed.

Also, the apparatus for providing a cloud streaming service according to an embodiment of the present invention encodes all of the basic coding units of the second area using a skip mode, thereby generating a second elementary stream for the second area.

Here, the reason for generating the second elementary stream through encoding using a skip mode is that a general user interface displays personalized information (e.g., information such as points, vouchers, or the like of a user) in an area in which video is not playing.

Also, the apparatus for providing a cloud streaming service according to an embodiment of the present invention may merge the generated first elementary stream and second elementary stream and transmit the same to a client terminal.

Through the above-described configuration, the apparatus for providing a cloud streaming service according to an embodiment of the present invention may encode the image to provide through cloud streaming on a server side and provide the same.

Also, the apparatus for providing a cloud streaming service according to an embodiment of the present invention separately encodes the respective areas of the image to provide through cloud streaming, thereby reducing the consumption of network resources.

Also, the apparatus for providing a cloud streaming service according to an embodiment of the present invention encodes an elementary stream for an image in advance, thereby preventing resources from being overloaded.

Also, the apparatus for providing a cloud streaming service according to an embodiment of the present invention may provide a cloud streaming service provision apparatus capable of accommodating a greater number of concurrent users (CCUs).

Figure 8:
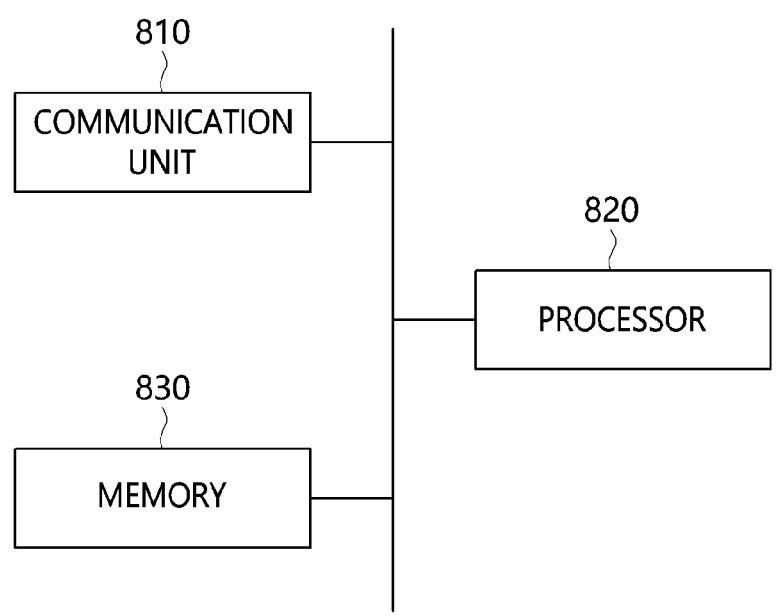
FIG. 8 is a block diagram of an apparatus for providing a cloud streaming service according to an embodiment of the present invention.

FIG. 8 is a block diagram of an apparatus for providing a cloud streaming service according to an embodiment of the present invention.

Referring to FIG. 8, the apparatus for providing a cloud streaming service according to an embodiment of the present invention may include a communication unit 810, a processor 820, and executable memory 830.

Here, the communication unit 810 serves to transmit and receive information related to a cloud streaming service to and from multiple client terminals through a communication network, such as the network illustrated in FIG. 1.

Particularly, the communication unit 810 according to an embodiment of the present invention may receive a request for a cloud streaming service from a client terminal, and may provide the client terminal with a screen that shows the result of execution of an application corresponding to the cloud streaming service requested by the client terminal.

Here, the communication unit 810 may use a communication network. Here, the network provides a channel via which data is delivered between the apparatus for providing a cloud streaming service and client terminals, and may be conceptually understood as including networks that are currently being used and networks that have yet to be developed.

For example, the network may be any one of a wired/wireless local area communication network for providing communication between various kinds of data devices in a limited area, a mobile communication network for providing communication between mobile devices or between a mobile device and the outside thereof, a satellite communication network for providing communication between earth stations using a satellite, and a wired/wireless communication networks, or may be a combination of two or more selected therefrom. Meanwhile, the transmission protocol standard for the network is not limited to existing transmission protocol standards, but may include all transmission protocol standards to be developed in the future.

Here, the processor 820 performs a pipelined procedure depending on a change in the screen of the application for the cloud streaming service, thereby providing the cloud streaming service to the client terminal.

Here, the client terminal is a device capable of running an application based on a cloud-computing system by being connected to a communication network, and may be any of various types of terminals including all types of information communication devices, multimedia terminals, wired terminals, fixed-type terminals, Internal Protocol (IP) terminals, and the like, rather than being limited to a mobile communication terminal.

Also, the client terminal may be a mobile terminal compliant with any of various mobile communication specifications, such as a Set-Top-Box (STB), a legacy box, a mobile phone, a Portable Multimedia Player (PMP), a Mobile Internet Device (MID), a smartphone, a desktop, a tablet PC, a note book computer, a net book, a Personal Digital Assistant (PDA), a smart TV, an information communication device, or the like.

Also, the client terminal may receive various kinds of information, such as numbers, letters, and the like, and may deliver input signals, which are related to settings of various functions and control of the functions thereof, to the control unit thereof via the input unit thereof. Also, the input unit of the client terminal may be configured by including at least one of a keypad and a touch pad, which generate an input signal in response to a touch or manipulation by a user. Here, the input unit of the client terminal and the display unit thereof are configured in the form of a single touch panel (or a touch screen), thereby performing both an input function and a display function. Also, the input unit of the client terminal may use not only input devices, such as a keyboard, a keypad, a mouse, a joystick, and the like, but also all types of input means to be developed in the future.

Also, the display unit of the client terminal may display information about a series of operation states and operation results, which is generated when the client terminal performs a function. Also, the display unit of the client terminal may display the menu thereof and user data input by a user. Here, the display unit of the client terminal may be configured as a Liquid Crystal Display (LCD), a Thin Film Transistor LCD (TFT-LCD), a Light-Emitting Diode (LED), an Organic LED (OLED), an Active Matrix OLED (AMOLED), a retina display, a flexible display, a 3-dimensional display, or the like. Here, when the display unit of the client terminal is configured in the form of a touch screen, it may perform some or all of the functions of the input unit thereof.

Also, the storage unit of the client terminal is a device for storing data, and may include a main storage device and an auxiliary storage device and store applications required for performing the functions of the client terminal. Such a storage unit of the client terminal may include a program area and a data area. Here, when it activates each function in response to a request from a user, the client terminal provides the function by running corresponding applications under the control of the control unit.

Also, the communication unit of the client terminal may perform functions for transmitting and receiving data to and from the apparatus for providing a cloud streaming service via the network. Here, the communication unit of the client terminal may include an RF transmission means for up-conversion and amplification of the frequency of the signal to be transmitted and an RF reception means for low-noise amplification of a received signal and down-conversion of the frequency thereof. Such a communication unit of the client terminal may include at least one of a wireless communication module and a wired communication module. Also, the wireless communication module is a component for transmitting and receiving data based on a wireless communication method, and when it uses wireless communication, the client terminal may transmit and receive data to and from the apparatus for providing a cloud streaming service using any one of a wireless network communication module, a wireless LAN communication module, and a wireless PAN communication module. Also, the wired communication module is for transmitting and receiving data in a wired manner. The wired communication module accesses the network using a cable, thereby transmitting and receiving data to and from the apparatus for providing a cloud streaming service. That is, the client terminal may access the network using a wireless communication module or a wired communication module, and may transmit and receive data to and from the apparatus for providing a cloud streaming service through the network.

Also, the control unit of the client terminal may be a processing device for running an Operating System (OS) and respective components. For example, the control unit may control the overall process of accessing the apparatus for providing a cloud streaming service. When access to the apparatus for providing a cloud streaming service is made through a special service application, the control unit may control the overall process of executing the service application in response to a request from a user, and may perform control such that the request for using a service is transmitted to the apparatus for providing a cloud streaming service at the time of execution of the application. Here, the control unit may perform control such that information about the client terminal required for user authentication is transmitted along with the request.

More specifically, the apparatus for providing a cloud streaming service according to an embodiment of the present invention includes one or more processors and executable memory 830 for storing at least one program executed by the one or more processors 820. The at least one program may segment the frame to be provided through cloud streaming into a first area and a second area, generate a first elementary stream by encoding the first area, generate a second elementary stream by encoding the second area, merge the first elementary stream and the second elementary stream in response to a request from a user, and transmit the merged stream.

Here, the first area may be an area configured with one or more basic coding units included in a section in which video is playing or in which motion is present in the frame.

Here, the second area may be an area configured with one or more basic coding units included in the remaining section, excluding the first area, in the frame.

Here, the basic coding unit may be any one of a macroblock and a Coding Tree Unit (CTU).

Here, the at least one program may segment the frame by classifying the first area and the second area as any one of a slice, a tile, a brick, and a sub-picture.

Here, the at least one program may generate the first elementary stream by encoding the first area using only P pictures.

Here, the at least one program may generate the first elementary stream by encoding the basic coding units included in the first P picture of the first area using an intra mode.

Here, the at least one program may generate the second elementary stream by encoding the second area using a skip mode.

Through the above-described configuration, the apparatus for providing a cloud streaming service according to an embodiment of the present invention may encode the image to provide through cloud streaming on a server side and provide the same.

Also, the apparatus for providing a cloud streaming service according to an embodiment of the present invention separately encodes the respective areas of the image to provide through cloud streaming, thereby reducing the consumption of network resources.

Also, the apparatus for providing a cloud streaming service according to an embodiment of the present invention encodes an elementary stream for an image in advance, thereby preventing resources from being overloaded.

Also, the apparatus for providing a cloud streaming service according to an embodiment of the present invention may provide a cloud streaming service provision apparatus capable of accommodating a greater number of concurrent users (CCUs).

Figure 9:
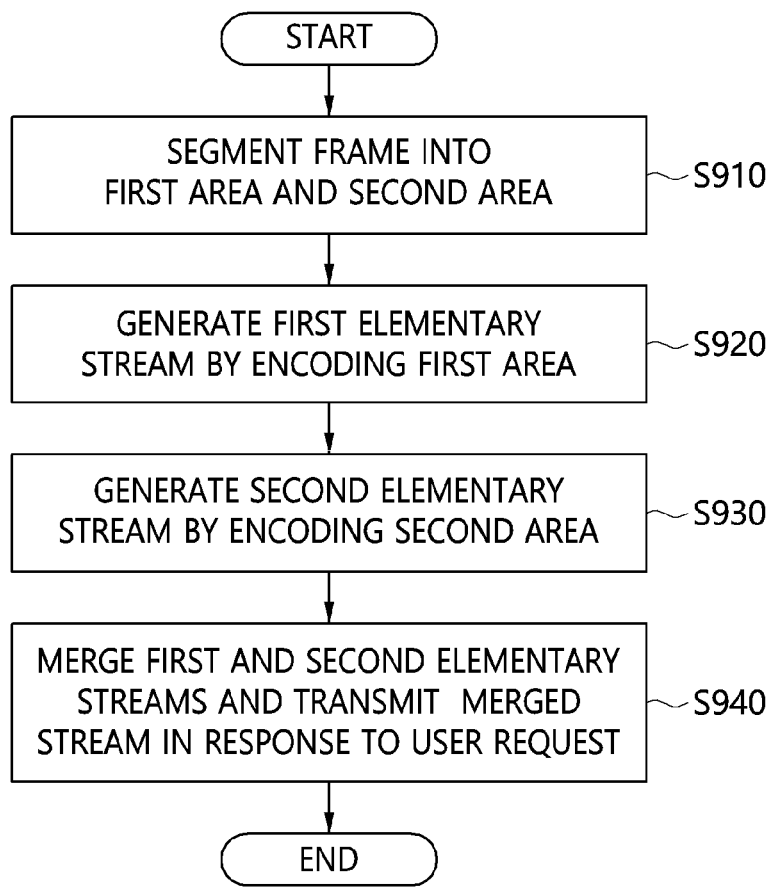
FIG. 9 is a flowchart of a method for providing a cloud streaming service according to an embodiment of the present invention.

FIG. 9 is a flowchart of a method for providing a cloud streaming service according to an embodiment of the present invention.

Referring to FIG. 9, the method for providing a cloud streaming service according to an embodiment of the present invention, which is performed through an apparatus for providing a cloud streaming service, is configured such that, first, the frame to be provided through cloud streaming is segmented into a first area and a second area at step S910.

Here, the first area may be an area configured with one or more basic coding units included in a section in which video is playing or in which motion is present in the frame.

Here, the second area may be an area configured with one or more basic coding units included in the remaining section, excluding the first area, in the frame.

Here, the basic coding unit may be any one of a macroblock and a Coding Tree Unit (CTU).

Here, at step S910, each of the first area and the second area is classified as any one of a slice, a tile, a brick, and a sub-picture, whereby segmentation may be performed.

Also, in the method for providing a cloud streaming service according to an embodiment of the present invention, a first elementary stream is generated at step S920 by encoding the first area.

Here, at step S920, the first elementary stream may be generated by encoding the first area using only P pictures.

Here, at step S920, the first elementary stream may be generated by encoding the basic coding units included in the first P picture of the first area using an intra mode.

Also, in the method for providing a cloud streaming service according to an embodiment of the present invention, a second elementary stream is generated at step S930 by encoding the second area.

Here, at step S930, the second elementary stream may be generated by encoding the second area using a skip mode.

Also, in the method for providing a cloud streaming service according to an embodiment of the present invention, the first elementary stream and the second elementary stream are merged and transmitted based on a request from a user at step S940.

Through the above-described configuration, the method for providing a cloud streaming service according to an embodiment of the present invention may be configured such that the image to be provided through cloud streaming is encoded on a server side and is then provided.

Also, the method for providing a cloud streaming service according to an embodiment of the present invention may reduce the consumption of network resources by separately encoding the respective areas of the image to be provided through cloud streaming.

Also, the method for providing a cloud streaming service according to an embodiment of the present invention is configured such that elementary streams for an image are encoded in advance, thereby preventing resources from being overloaded.

Also, the method for providing a cloud streaming service according to an embodiment of the present invention may provide a cloud streaming service provision method that enables accommodation of a greater number of concurrent users (CCU).

The functional operations and implementations of the subject matter described in this specification may be implemented as digital electronic circuitry, or may be implemented in computer software, firmware, or hardware, including the structures disclosed herein and structural equivalents thereof, or one or more combinations thereof. Implementations of the subject matter described herein may be implemented in one or more computer program products, in other words, one or more modules of computer program instructions encoded on a tangible program storage medium, in order to control the operation of a processing system or to be executed by the processing system.

The computer-readable medium may be a machine-readable storage device, a machine-readable storage substrate, a memory device, a composition of material that affects a machine-readable radio-wave-type signal, or one or more combinations thereof.

In this specification, the terms 'system' and 'device' encompass all kinds of apparatuses, devices and machines for processing data, which include, for example, a programmable processor and a computer, or multiple processors and a computer. In addition to hardware, the processing system may also include, for example, code that configures processor firmware and code that configures an execution environment for computer programs in response to a request for a protocol stack, a database management system, an operating system, or one or more combinations thereof.

A computer program (also known as a program, software, a software application, a script, or code) may be written in any form of programming language including a compiled or interpreted language, or an a priori or procedural language, and may be deployed in any form including standalone programs or modules, components, subroutines, or other units suitable for use in a computer environment. The computer program does not necessarily correspond to a file in a file system. The program may be stored in a single file provided to the requested program, in multiple interactive files (for example, files storing one or more modules, subprograms or portions of code), or in a part of a file containing other programs or data (for example, one or more scripts stored in a markup language document). The computer program may be located at a single site, or may be distributed across multiple sites such that it is deployed to run on multiple computers interconnected by a communications network or on a single computer.

Meanwhile, the computer-readable medium suitable for storing computer program instructions and data may include, for example, semiconductor memory devices, such as EPROM, EEPROM and flash memory devices, all types of nonvolatile memory, including magnetic disks, such as internal hard disks or removable disks, magnetic optical disks, CD-ROM and DVD-ROM disks, media, and memory devices. A processor and memory may be supplemented by special-purpose logic circuits, or may be integrated therewith.

Implementations of the subject matter described herein may be realized on an arithmetic system including, for example, a back-end component such as a data server, a middleware component such as an application server, a front-end component such as a client computer having a web browser or a graphical user interface through which a user can interact with the implementations of the subject matter described herein, or one or more combinations of the back-end component, the middleware component, and the front-end component. The components of the system may be interconnected using any form or medium of digital data communication such as a communication network.

While this specification includes the details of multiple specific implementations, they should not be construed as limiting the scope of the invention or the claimable scope, but should be understood as descriptions of features that may be specific to particular embodiments of the invention. Similarly, the specific features described herein in the context of individual embodiments may be implemented by being combined in a single embodiment. Alternatively, various features described in the context of a single embodiment may also be implemented in multiple embodiments individually or in any suitable sub-combination. Further, although such features may be described as operating in a particular combination and initially claimed as such, one or more features from the claimed combination may be excluded from the combination in some cases, or the claimed combination may be altered to a sub-combination or variation thereof.

Also, while this specification illustrates operations in a particular order in the drawings, it should not be understood that such operations must be performed in the particular order or the sequential order shown in the drawings in order to obtain the desired result, or that all of the illustrated operations must be performed. In certain cases, multitasking and parallel processing may be advantageous. Also, separation of the various system components of the above-described embodiment should not be understood as requiring such separation in all embodiments, and it should be understood that the program components and systems described above may generally be integrated into a single software product or packaged into multiple software products.

As described above, this specification is not intended to limit the present invention to the specific terms disclosed herein. Therefore, although the present invention has been described in detail with reference to the above examples, those skilled in the art may conceive alterations, modifications, and variations on these examples without departing from the scope of the present invention. The scope of the present invention is defined by the appended claims rather than the description, and it should be construed that all alterations and modifications derived from the meaning and scope of the appended claims and their equivalents are included within the scope of the present invention.

According to the present invention, a method and apparatus for providing a cloud streaming service are disclosed. The method for providing a cloud streaming service according to an embodiment of the present invention, performed through an apparatus for providing a cloud streaming service, includes segmenting the frame to be provided through cloud streaming into a first area and a second area, generating a first elementary stream by encoding the first area, generating a second elementary stream by encoding the second area, and merging the first elementary and the second elementary stream and transmitting the same based on a request from a user, thereby providing the cloud streaming service provision method enabling accommodation of a greater number of concurrent users (CCUs).

According to the present invention, the image to be provided through cloud streaming may be encoded on a server side, and may then be provided.

Also, according to the present invention, the respective areas of the image to be provided through cloud streaming are encoded separately, whereby the consumption of network resources may be reduced.

Also, according to the present invention, an elementary stream for an image is encoded in advance, whereby resources may be prevented from being overloaded.

Also, according to the present invention, there may be provided a cloud streaming service provision apparatus capable of accommodating a greater number of concurrent users (CCUs).

The effects of the present embodiments are not limited to the above-mentioned effects, and other effects that are not mentioned can be clearly understood by those skilled in the art from the appended claims.

As described above, the method for providing a cloud streaming service using a skip frame and the apparatus for the same according to the present invention are not limitedly applied to the configurations and operations of the above-described embodiments, but all or some of the embodiments may be selectively combined and configured, so that the embodiments may be modified in various ways.

What is claimed is:

1. A method for providing a cloud streaming service, comprising:
   segmenting each of frames of images to be provided through cloud streaming into a first area in which video is playing or in which motion is present, and a second area in which the video is not playing;
   generating a first elementary stream by encoding each of first basic coding units of the first area using one of a plurality of modes;

generating a second elementary stream by encoding each of second basic coding units of the second area in a single mode, wherein the single mode is a skip mode;

merging the first elementary stream and the second elementary stream into a merged stream; and transmitting the merged stream based on a request from a user, wherein the second area is at a side of the first area and does not spatially overlap with the first area in the frame, and includes information personalized for the user, the personalized information remaining unchanged across the frames of images.

2. The method of claim 1, wherein the first elementary stream is generated by encoding the first area using only P pictures.

3. The method of claim 1, wherein the first elementary stream is generated by encoding the first basic coding units in a first frame of the video using at least an intra mode.

4. An apparatus for providing a cloud streaming service, comprising:

one or more processors; and memory for storing instructions thereon, the instructions when executed by the one or more processors cause the one or more processors to:

segment each of frames of images to be provided through cloud streaming into a first area in which video is played or in which motion is present, and a second area in which the video is not playing;

generate a first elementary stream by encoding each of first basic coding units of the first area using one of a plurality of modes;

generate a second elementary stream by encoding each of second basic coding units of the second area in a single mode, wherein the single mode is a skip mode;

merge the first elementary stream and the second elementary stream into a merged stream; and transmit the merged stream based on a request from a user, wherein the second area is at a side of the first area and does not spatially overlap with the first area in the frame, and includes information personalized to the user is displayed in the second area.

5. The apparatus of claim 4, wherein the instructions cause the one or more processors to generate the first elementary stream by encoding the first area using only P pictures.

6. The apparatus of claim 4, wherein the instructions cause the one or more processors to generate the first elementary stream by encoding the first basic coding units in a first frame of the video using an intra mode.

7. The method of claim 1, wherein the first elementary stream is generated responsive to updating of a user interface or changing of content of the video.

8. The method of claim 1, wherein the first elementary stream and the second elementary stream are merged into the merged stream before the request is received from the user.

9. The method of claim 1, wherein the side of the first area is predetermined.

10. The method of claim 9, wherein the side of the first area is a bottom side of the first area, and a horizontal length of the second area is identical to a horizontal length of the first area.

11. The method of claim 1, wherein the first area is larger than the second area.

12. The apparatus of claim 4, wherein the one or more processors generate the first elementary stream responsive to updating of a user interface or changing of content of the video.

13. The apparatus of claim 4, wherein the one or more processors merge the first elementary stream and the second elementary stream into the merged stream before the request is received from the user.

14. The apparatus of claim 4, wherein the side of the first area is predetermined.

15. The apparatus of claim 14, wherein the side of the first area is a bottom side of the first area, and a horizontal length of the second area is identical to a horizontal length of the first area.

16. The apparatus of claim 4, wherein the first area is larger than the second area.

* * * * *